United States Patent [19]

Kotski et al.

[11] 4,212,387
[45] Jul. 15, 1980

[54] CABLE REPAIR KIT

[75] Inventors: Edward J. Kotski, Hackettstown; Larry N. Siebens, Great Meadows; Donald D. Perry, Milford, all of N.J.

[73] Assignee: Amerace Corporation, New York, N.Y.

[21] Appl. No.: 970,254

[22] Filed: Dec. 18, 1978

[51] Int. Cl.² .................... H02G 15/08; B65D 81/32; B65D 85/00
[52] U.S. Cl. ................................. 206/223; 206/568; 206/582; 206/219
[58] Field of Search ................ 206/223, 219, 568, 582

[56] References Cited

U.S. PATENT DOCUMENTS

| | | | |
|---|---|---|---|
| 1,662,945 | 3/1928 | Wielage | 206/223 |
| 3,087,606 | 4/1963 | Bollmeier et al. | 206/219 |
| 3,359,361 | 12/1967 | Oakman | 206/219 |
| 3,385,922 | 5/1968 | Rice | 206/219 |
| 3,491,875 | 1/1970 | Fischer et al. | 206/229 |
| 3,638,785 | 1/1972 | Casteel et al. | 206/229 |

Primary Examiner—William T. Dixson, Jr.
Attorney, Agent, or Firm—Richard A. Craig; S. Michael Bender; Ken Richardson

[57] ABSTRACT

A cable repair kit including the component parts thereof and a process for repairing in the field simply and quickly high-voltage electrically conductive cables whose outer jackets have been damaged but whose inner conductors have not been damaged. The kit comprises a portable container sealingly enclosing abrasive material for abrading the damaged cable portion; a cleaning compound; a filler compound for restoring or filling in the damaged region of the cable jacket; a bonding agent for bonding a patch of insulative, flexible material circumferentially about the section of the cable wherein the damaged portion is located; the insulative patch material; and a flame-resistant tape for aiding the bonding agent in joining the patch to the cable, as well as providing the patch with a smooth and continuous surface at a junction between side edges thereof and the cable surface.

6 Claims, 9 Drawing Figures

CABLE REPAIR KIT

The present invention relates to the repair of electrical devices and more particularly to an electrical cable repair kit including the component parts thereof and a process for repairing in the field damaged cables such as those used to distribute electrical power to underground mining apparatus.

Presently, in underground mining applications, high-voltage power cables, extending from permanently wired power stations, are customarily employed to supply electrical energy to various types of mining apparatus such as, for example: vehicles for the transporting of coal, equipment, and mine workers; mine hoists; mine drills; rock dusters; roof bolters; and mine ventilation fans; to name a few. Frequently, in the course of using such apparatus the cables are damaged by being cut, knicked, gouged, pinched, etc., the damage, however, being only to the outer protective jacket or layer of the cable rather than to the inner conductor of the cable, hence the cables are not damaged to the extent where they require either a splice of the conductive core or replacement thereof, but merely to the extent which prevents their safe use, as well as to an extent which prevents the safe use of the specific equipment to which the cables are connected until they are repaired. Damage of the foregoing kind may result from repetitive cycles of stress, produced say, by the action of a winding reel associated with an apparatus acting on the cables, or from sudden impact produced for example, by rock falls. At times, such cable damage may occur as a result of the cables being either run over accidentally by the wheels of a transport vehicle or from being subjected to the weight of yet other kinds of mining equipment placed accidentally or inadvertently thereon, as well as from exposure to fire, corrosive liquids, extreme temperature variations, and other contaminants which could have a deleterious effect upon the integrity of the protective covering of the cables.

Since it is desirable to repair the damaged cables in the field to decrease downtime, such repairs must satisfy design requirements for protecting the cables from the harmful influences of its environment and satisfy mechanical and electrical operational requirements considered in underground mining applications to be reliable and safe in accordance with good engineering practices and safety standards. For example, the repaired cable must satisfy the high-voltage, high-current rating characteristics typically required of portable mining cables, as well as have a suitably high degree of flexibility and tensile strength performance especially where it is employed with transport vehicles and/or winding reels. Moreover, in instances where the cables are employed with winding reels, the repaired portions of the cables are required to have relatively uniform cross sections and fairly continuous smooth outer surfaces so as to facilitate free travel of the repaired portion of the cable through cable issue/take-up ports associated with the winding reels.

However, repairing a cable in the field such that it possesses the above desirable attributes poses a difficult problem since the choices of material and equipment employed in making cable repairs are normally more limited in the field than that available in a shop or factory. Moreover, the skill of workers in the field is usually more general in nature than that possessed by workers in the shop or factory and usually lacks the high degree of specialized knowledge required in the repair of damaged cables. In an attempt to solve the foregoing problem, prior art techniques for repairing damaged cables in the field, which do not need to be spliced or completely replaced, usually entail wrapping the damaged cable section with conventional electrical friction tape. In some cable repair applications a heat shrinkable sleeve is bonded and shrunk tightly about the taped portion with the aid of a hot-melt adhesive and a portable gas powered air blower.

Prior art cable repair techniques and prior art equipment used therewith, however, have suffered from one or more severe shortcomings. To illustrate, heretofore no one has provided a portable cable repair kit which includes conveniently therein all of the component parts necessary to enable maintenance workers of limited skill to simply and quickly accomplish a reliable on site repair of damaged cables not in need of a splice such that the repair meets good engineering and safety practices and produces a repaired cable with attributes normally only associated with those cable repairs effected in the factory or shop.

Additionally, in those prior art repair techniques where heat shrinkable sleeves are employed, the heat utilized to shrink the sleeves often causes the sleeves to become brittle and later crack, thus, eventually causing the repaired portion of the cable to fail in performing its electrical, mechanical and environmental-protective functions. Moreover, the need to transport the gas-operated air blower to the job site to effect shrinking the sleeve, as a consequence of electrical power and/or equipment not normally being available for this purpose beyond the limits of permanent mine wiring, poses an inconvenience, as well as the use of such air blowers increasing the risk of loss or injury in the underground mine environment. In addition to this, the bonding agent used in prior art cable repair techniques has often failed to hold satisfactorily the heat shrinkable patch-material to the cable surface when exposed to fire or water and when the cable is flexing under the action of bending forces.

Accordingly, the present invention has as its principle object the provision of a portable kit for effecting the repair of electrical cables in a simple and efficient manner.

It is yet another object of the present invention to provide a process for repairing effectively and reliably rubber constructed conduits or high voltage electrically conductive cables whose conductors have not been damaged, such as those used with a winding reel and/or mining vehicles in underground mining applications as discussed above, as well as overcoming many of the shortcomings of prior art cable repair techniques.

To the accomplishment of these objectives, the present invention briefly described contemplates a portable cable repair kit comprising a portable container sealingly enclosing abrasive material for abrading the damaged cable portion; a cleaning compound; a filler compound for restoring or filling in the damaged region of the cable jacket; a bonding agent for bonding a patch of insulative, flexible materially circumferentially about the section of the cable wherein the damaged portion is located; the insulative patch material; and a flame-resistant tape for aiding the bonding agent in joining the patch to the cable, as well as providing the patch with a smooth and continuous surface at a junction between side edges thereof and the cable surface.

The foregoing and other objects and features of the invention will be further evidenced from the following detailed description of the preferred embodiment of the invention in connection with the accompanying drawing wherein.

Figure 1:
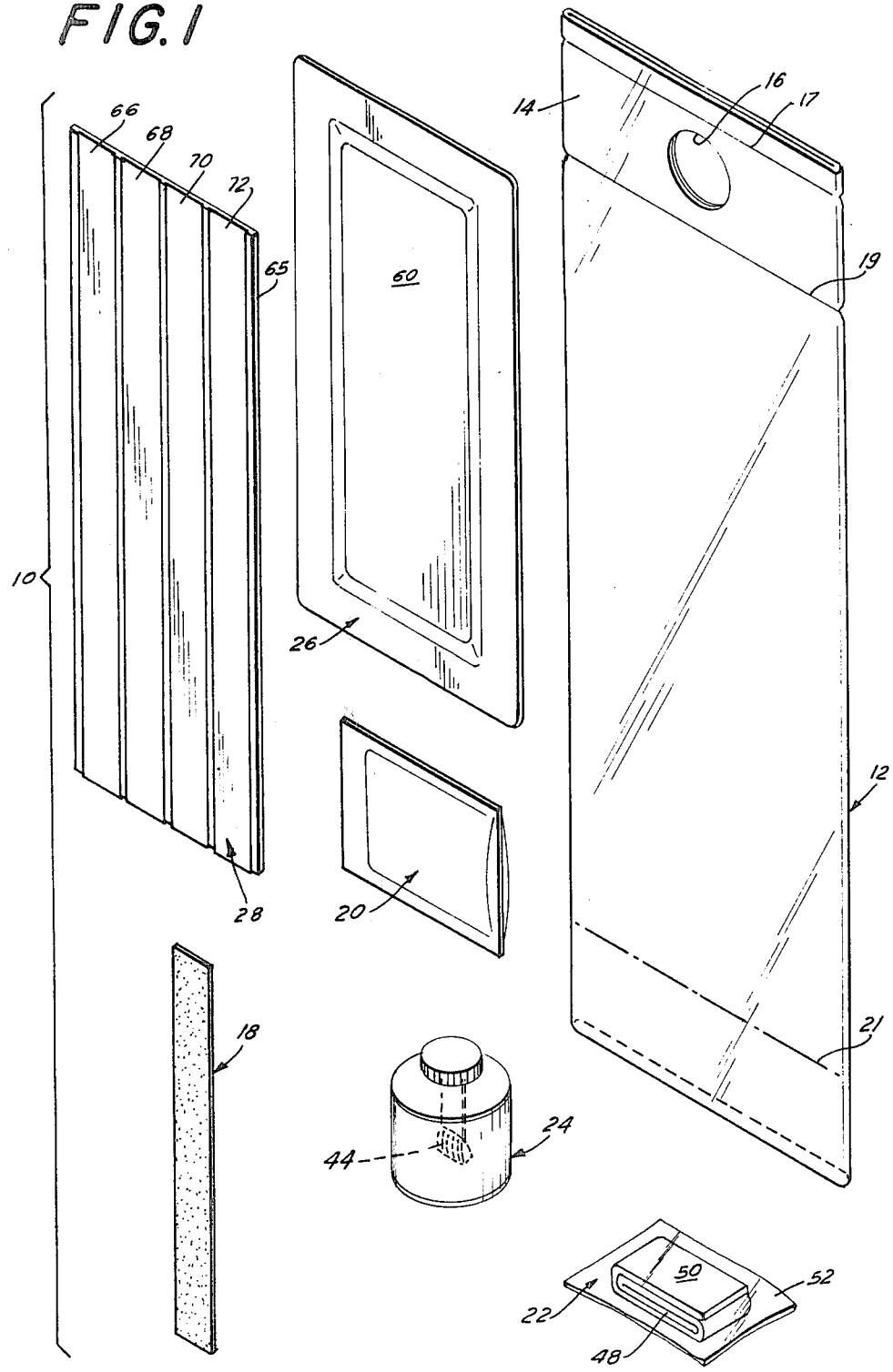
FIG. 1 illustrates the cable repair kit and the component parts thereof in accordance with the invention.

Turning initially to FIGS. 1-5, there is shown a preferred form of the present invention comprising a cable repair kit or package and the component parts thereof, which kit is designated generally by the reference numeral 10. Kit 10 and the process practiced therewith enables a worker of limited skill to easily and quickly effect the on-site or in field repair of rubber conduits or electrical power cables whose outer jackets have been damaged but whose inner conductors have not been damaged, such as, for example, a high-voltage feeder cable used in underground mining applications to provide power to electrical mining apparatus. An example of such mining cable and the manner in which it is employed are described in U.S. Application Ser. No. 914,081, filed June 9, 1978, assigned to the same assignee as the present application, the disclosure of which is hereby incorporated herein by this reference.

Kit 10 includes a portable container or bag 12 for sealingly enclosing therein in one location all the component parts thereof thus, eliminating unnecessary trips by mine workers to obtain various component parts when repairing the cables at the job site. Portable container or bag 12 preferably is in the form of a flexible plastic sleeve (e.g., polyethylene) having a carrying handle 14 defined by a circular shaped through aperture 16 in the opposed side walls of the sleeve near the top thereof substantially as illustrated in FIG. 1. The opposed side walls of the sleeve are heat sealed together along lines or seams 17, 19 above and below aperture 16 to sealing close the upper portion of the sleeve and to form the handle 14. In the preferred form of the cable repair kit, the component parts to be enclosed within bag 12 comprise the following: an elongated strip 18 of abrasive material; a cable cleaning compound 20; a filler compound 22; a bonding agent 24; a patch 26 of insulative material; and plural strips of tape 28. Also included is printed sheet (not shown) containing instructions for repairing the cable using the components of the kit.

It will be appreciated that after these component parts are placed into sleeve 12, the latter may be heat sealed at its bottom end along a line or seam 21 to completely enclose the kit components therein.

Figure 2:
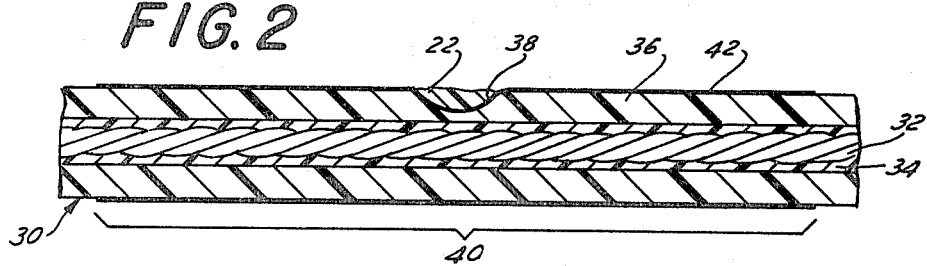
FIG. 2 illustrates in section a portion of a high-voltage electrical cable having a damaged area partially restored in accordance with the present invention.

Turning now to FIG. 2, a portion of a typical cable 30 with which the cable repair kit of the present invention may be used comprises at least one conductive core 32 encased in a sheath of insulation 34, which in turn, is encased in an outer protective layer or jacket 36 of insulative material such as neoprene rubber, for example. As schematically indicated, cable 30 has suffered damage to the extent that a portion of the outer protective layer or jacket has been gouged therefrom leaving a cavity 38.

Before using any of the aforesaid component parts of kit 10, the section 40 of the cable 38 adjacent to and surrounding the damaged area or cavity 38 is located and wiped with a rag (not shown) to clear or free this section of any accumulated dirt, grease, water, oils, corrosive liquids or other such contaminants which may be on the cable surface or more importantly, lodged within cavity 38. Generally speaking and for reasons which will become apparent below, the longitudinal extent of the cleaned section 40 should be about the same as that of patch 26.

If bag 12 is still sealed it is then opened and the elongated strip of abrasive material is employed to roughen the outer surface of the cable coextensive with section 40 so as to facilitate adhesion of bonding agent 24 to the surface of the cable and joining of the patch-material 26 to the damaged cable jacket surface, as will be more fully explained below. For this purpose, abrasive strip 18 may comprise sandpaper of any well-known non-conductive type.

Cleaning compound 20 next is employed to further clean the abraded section 40 surrounding and including the damaged region of the cable, and to assure that this surface area is as free as possible of any of the aforesaid contaminants. Cleaning compound 20 is preferably of the well-known evaporative solvent type such as perchloroethylene, packaged in the form of a solvent laden, folded sheet sealingly enclosed in a foil envelope or packet as is well-known in the art of cleaning materials. Cleaning of the abraded surface region 40 and of cavity 38 is effected simply by wiping same thoroughly with the solvent laden sheet and allowing the solvent to evaporate or dry.

After cleaning, a layer of the bonding agent or adhesive 24 is applied to the abraded, cleaned section 40 as indicated schematically in FIG. 2 by the heavy line 42. To facilitate application of the bonding agent to the surface of the cable jacket and to the cavity 38, the container for the bonding agent includes a cap which has integral therewith a bristle brush 44 so that the bonding agent may be painted on. Alternatively, a separate brush may be employed. Bonding agent 24 preferably comprises contact cement or rubber cement commercially available, for example, from Goodyear Tire and Rubber Company, trademark Pliobond 2005. After the cement is applied it should be left to dry until it becomes tacky which typically takes about five minutes. At this juncture, it also is convenient to apply a layer of the bonding agent to the bottom or flat under-surface of patch 26 such layer being indicated at reference numeral 46 in FIG. 4, with the patch 26 then also being set aside and left to dry until layer 46 becomes tacky.

After the layer 42 of contact cement a bonding agent has been applied to cable 30, the filler compound 22 may be employed to completely fill cavity 38 therewith with the filler compound being worked by hand so that it is even with the surface of the cable substantially as shown in FIG. 2. Filler compound 22 comprises an insulative rubbery compound compatible with the material of outer jacket 36 and of patch material 26 and is of putty-like consistency so that it can easily be shaped and molded to completely fill in any gouges, nicks, cuts, etc. in the surface of the outer jacket of the cable. The filler compound should preferably also have adhesive qualities so that it readily adheres to the cable material. An especially suitable material meeting the foregoing requirements is butyl rubber. In its preferred form, the butyl rubber filler compound employed in the present invention comprises a folded slab 48 of such material affixed to a serpentine shape 50 of release paper and enclosed in a small polyethelene bag 52.

Figure 3:
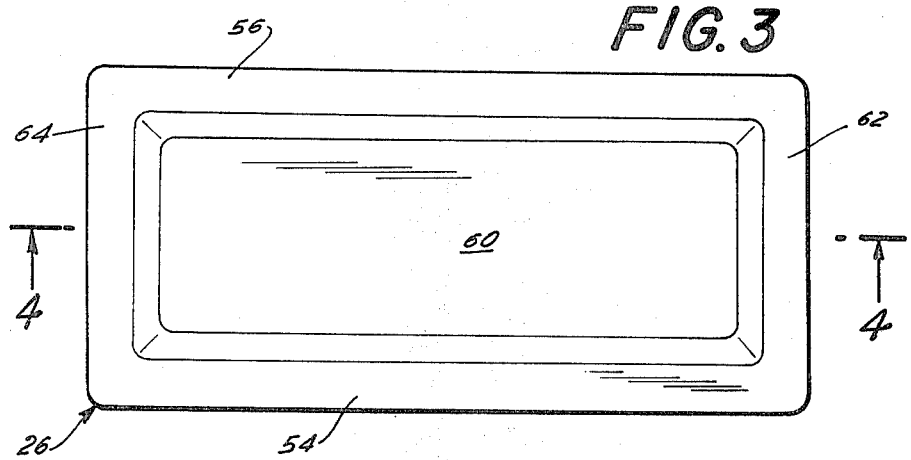
FIG. 3 is a plan view of the patch material component of the kit of FIG. 1.
Figure 4:
FIG. 4 is a sectional view taken along lines 4—4 of FIG. 3.
Figure 5:
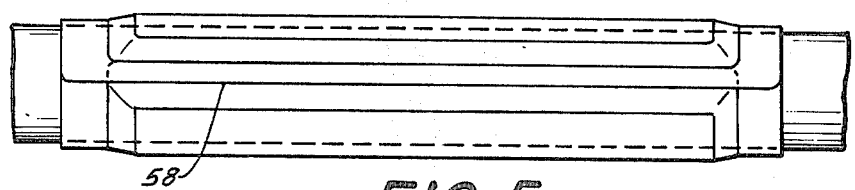
FIG. 5 illustrates the cable section of FIG. 2 having the patch component applied thereto.

The next step is to apply the patch 26 to the cable jacket outer surface. This is done by aligning the patch with the cable in a generally parallel manner and with the underside of the patch coextensive with the prepared section 40 surrounding the filled cavity 38. The patch is then wrapped circumferentially about the cable with pressure being maintained thereon sufficient to enable the contact cement layers applied to section 40 and to the underside of the patch to effect a secure adhesive bond between the cable jacket outer surface and the patch. As the patch is wrapped circumferentially about the cable, its transverse dimension is such that the opposed transverse edge portions thereof 54, 56 will overlap to form a longitudinal seam 58 as seen in FIG. 5. As shown in FIGS. 3 and 4, patch 26 comprises a generally flat, rectangular shape of a flexible, insulative material having good wearing characteristics since it serves as the protective jacket or covering for the restored portion of the cable. A suitable material is neoprene rubber. Although the bottom surface of the patch is flat as seen in FIG. 4, the transverse and longitudinal portions of the upper surface 54, 56 and 62, 64 thereof are beveled or tapered. Opposed longitudinal edge portions 62, 64 are tapered to provide a smooth transition from the outer surface of the cable jacket to the upper surface 60 of the patch (see FIG. 5), whereas the opposed transverse edge portions 54, 56 are tapered to provide a smooth, non-protruding seam 58 formed when these transverse edge portions are overlapped and adhered together via the layer of bonding agent 46 applied to the bottom surface of the patch. In one preferred form, patch 26 has the following dimensions: longitudinal dimension 12 inches (304.80 mm), transverse dimension 4.750 inches (120.65 mm), thickness 0.105 inches (2.67 mm), tapered length of each beveled edge portion 1.250 inches (31.75 mm). A patch 26 of this size is quite suitable for example, for repairing the outer jacket on an underground mining cable designation No. 2 AWG flat type G.

Figure 6:
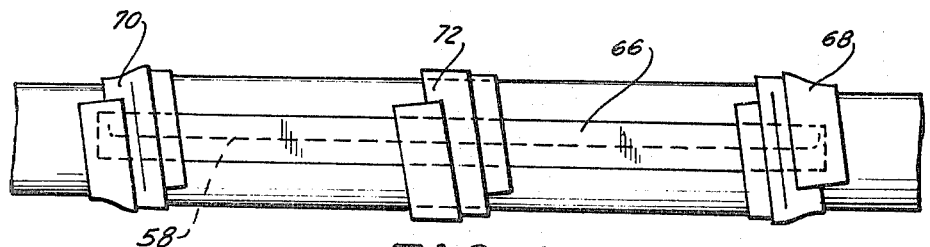
FIG. 6 illustrates the cable section of FIG. 5 having the tape component applied thereto.

Tape 28 is the final component utilized in repairing cable 30 and functions to aid bonding agent 24 in maintaining the patch adhered to the cable outer jacket as well as providing the outer surface of the repaired portion of the cable with a smooth continuous shape. Tape 28 also is intended to act as a flame-resistant shield covering any bonding agent exuded from between the patch 26 and the section 40 of the cable. To the accomplishment of the foregoing objectives, the tape material 28 is precut to convenient size and four strips of same are attached to a sheet of release paper 65 (FIG. 1), with the latter being folded for ease of insertion into sleeve 12. As best shown in FIG. 6 a first strip of tape 66 is longitudinally applied to cover seam 58 produced by the circumferentially overlapping edges 54, 56 of patch 26. Second and third strips of tape 68, 70 are then circumferentially applied about the cable and each opposed edge portion 62, 64 whereas the fourth strip of tape 72 is circumferentially applied about the middle portion of the patch 26 also as best seen in FIG. 6. Tape material 28 preferably is in the form of a flame-retardant, glass-reinforced, friction tape which satisfactorily passes the flame resistance test set forth in 30 CFR 18.64 of the Mine Safety and Health Administration. Such tape is commercially available from Tuck Industries, New Rochelle, N.Y., Trademark Tuck Tape No. 58.

Figure 7:
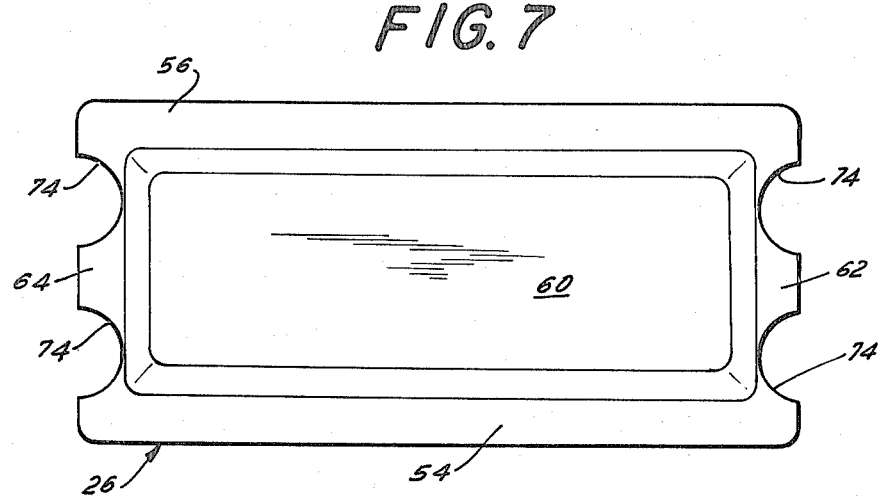
FIG. 7 illustrates in plan view an alternatively preferred patch-material component of the kit of FIG. 1.
Figure 8:
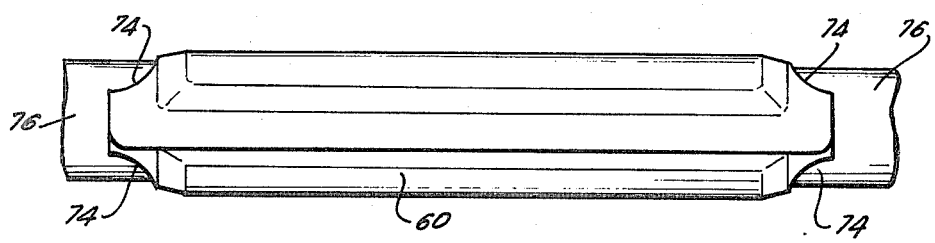
FIG. 8 illustrates the patch component of FIG. 7 applied to a section of cable.
Figure 9:
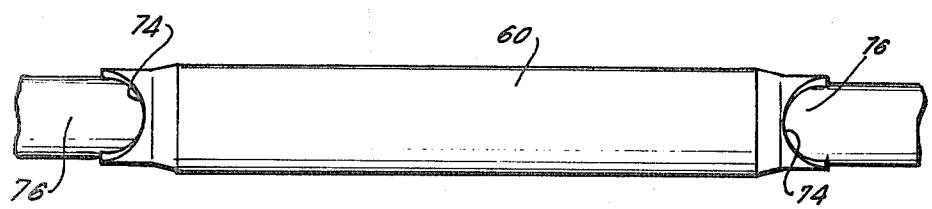
FIG. 9 illustrates the cable repair of FIG. 8 upon being rotated approximately 90° about its longitudinal axis.

Referring now to FIGS. 7 through 9 wherein like reference numerals represent like parts, there is shown an alternatively preferred form of patch 26 constructed such that each opposed beveled portion 62 and 64 is provided with a pair of spaced semi-circular shaped cut-outs 70 therein substantially as shown. The notched configuration produced by cut-outs 74 between beveled edge portions 62 and 64 and the cable jacket surface 76 when the patch is wrapped circumferentially about cable 30 and bonded thereto as depicted in FIGS. 7 and 8 reduces substantially the tendency of the beveled edge portions to lift from the cable surface as the cable distorts or flexes when subjected to bending forces under load conditions. Notably, this tendency is usually more pronounced in electrical cables having an oblong shaped transverse cross section. When such oblong shaped cables flex, portions of their outer cable surface tend to contract or shorten, while other portions of their outer cable surface simultaneously tend to expand or lengthen. Such dimensional changes in the outer surface of these cables causes stresses which act on the beveled edge portions 62 and 64 in a manner to increase the tendency of these edge portions to raise or peel from the cable surface 76. Hence, by providing the cut-outs or notches 74, such stresses are minimized and the lifting forces which would normally act thereon are reduced, thereby reducing substantially the tendency of edge portions 62 and 64 to separate from cable surface 76. When using the alternative embodiment of FIGS. 7–9 in connection with cables having an oblong shaped cross section, the patch should be circumferentially applied to the cable in such a manner that the cut-outs or notches are centered on the opposed narrow sides of the cable as shown to best advantage in FIGS. 8 and 9.

The principles of the present invention may be further modified without departing therefrom. Accordingly, the particular disclosed embodiments are intended in an illustrative and not in a limiting sense. The true spirit and scope of the invention is set forth in the appended claims.

We claim:
1. A cable repair kit having component parts therein capable of being utilized in the field to repair electrical cables or conduits, said kit comprising:
 (a) an abrasive material for roughening the damaged portion of said cable;
 (b) a cleaning compound for removing contaminants from said damaged portion of said cable;
 (c) a filler compound for augmenting broken surface regions of said damaged cable portion;
 (d) a bonding agent adapted to be applied to said damaged cable portion including said filler augmented cable surface region;
 (e) a flexible patch of electrically insulative material adapted to be wrapped circumferentially about said damaged cable portion and bonded thereto via said aforementioned bonding agent; and

(f) a tape material for taping edge portions of said patch to the outer surface of said cable to each other.

2. A cable repair kit as recited in claim 1, wherein said cleaning compound comprises perchloroethylene.

3. A cable repair kit as recited in claim 1, wherein said filler compound comprises butyl rubber.

4. A cable repair kit as recited in claim 1, wherein said bonding agent comprises a rubber contact cement.

5. The cable repair kit as recited in claim 1, wherein said patch-material comprises a shape of neoprene rubber.

6. The cable repair kit as recited in claim 1, wherein said tape material comprises a flame-resistant, glass-reinforced tape.

* * * * *